(Model.)
F. F. MOTLEY.
SCREW MACHINE.
No. 337,976. Fig. 1. Patented Mar. 16, 1886.
4 Sheets—Sheet 1.
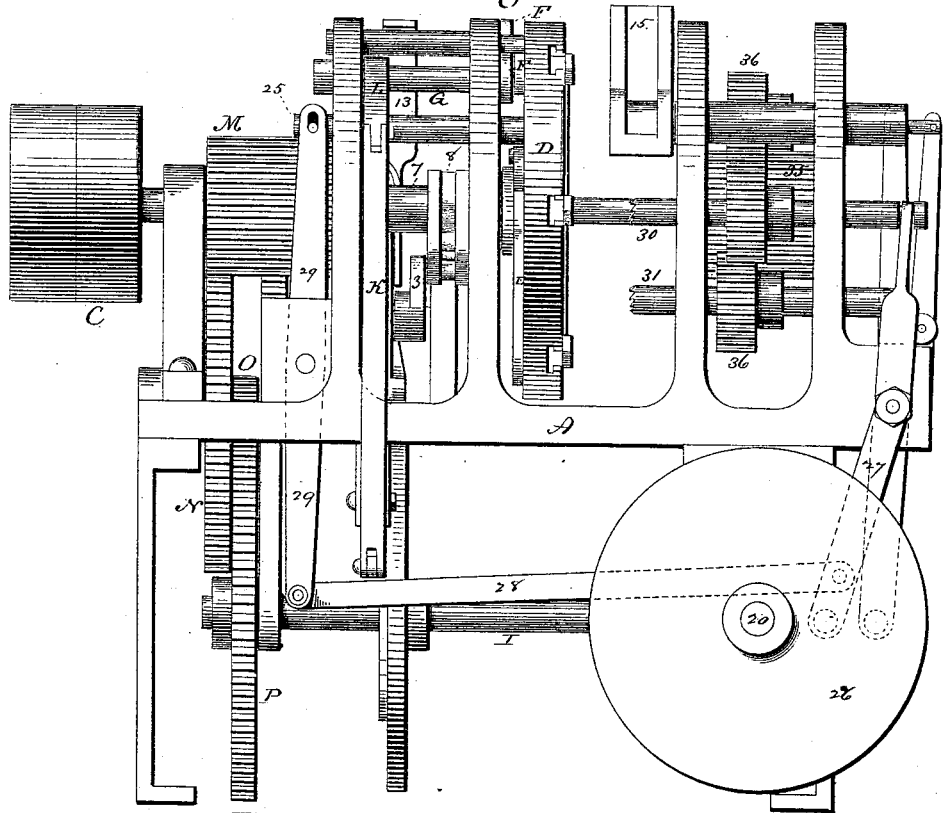
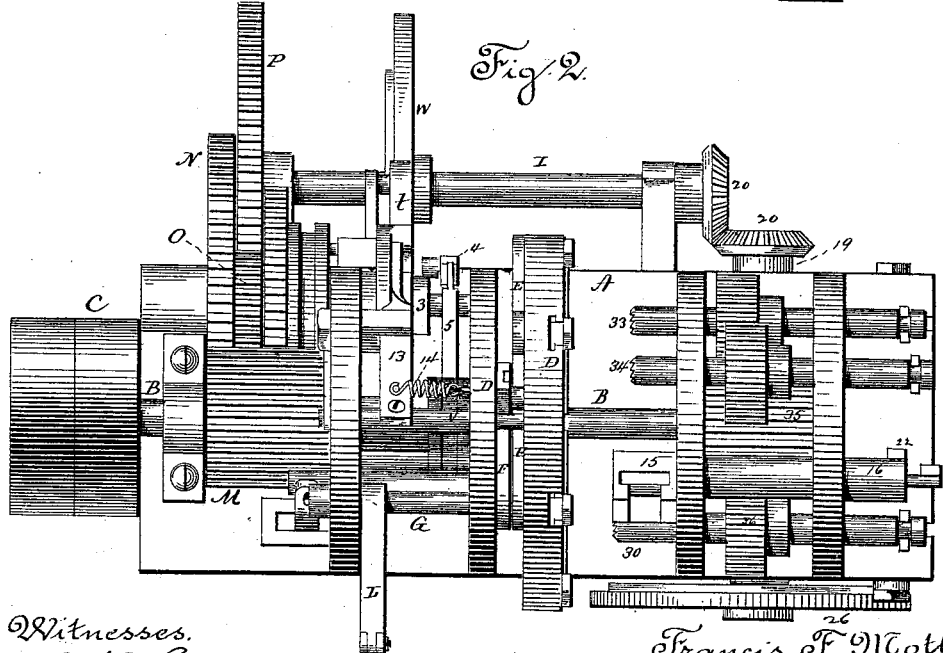
Fig. 2.
Witnesses.
J. H. Shumway
Fred C. Earle
Francis F. Motley, Inventor.
By Atty.

(Model.) 4 Sheets—Sheet 2.
F. F. MOTLEY.
SCREW MACHINE.
No. 337,976. Patented Mar. 16, 1886.
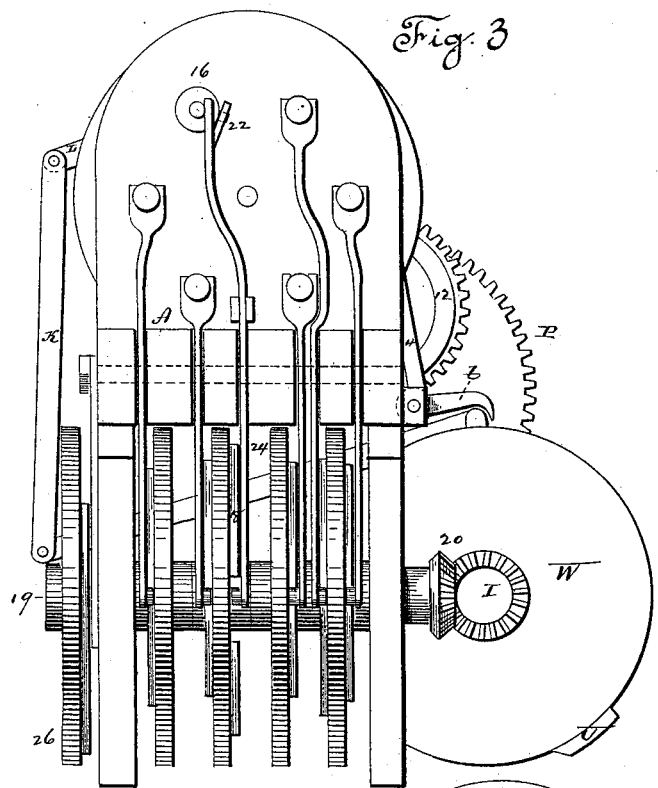
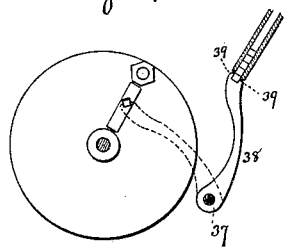
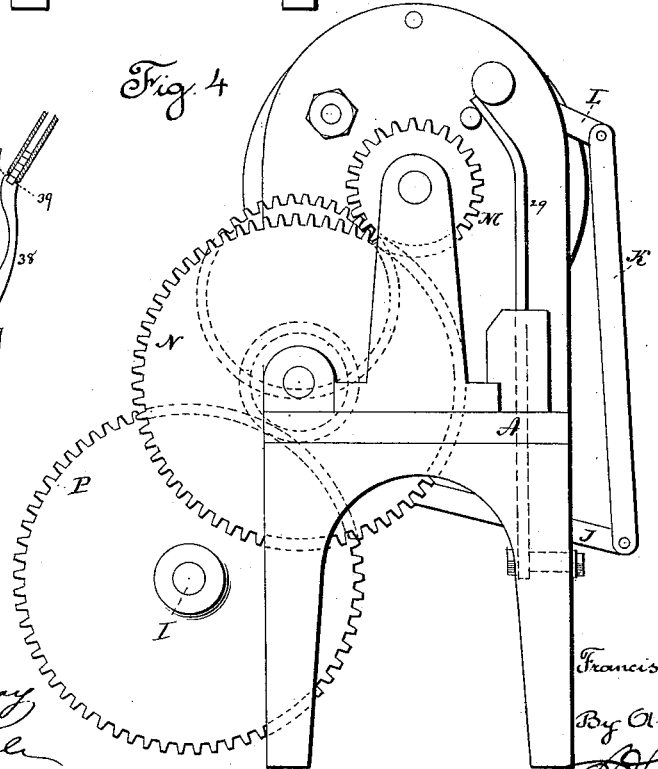

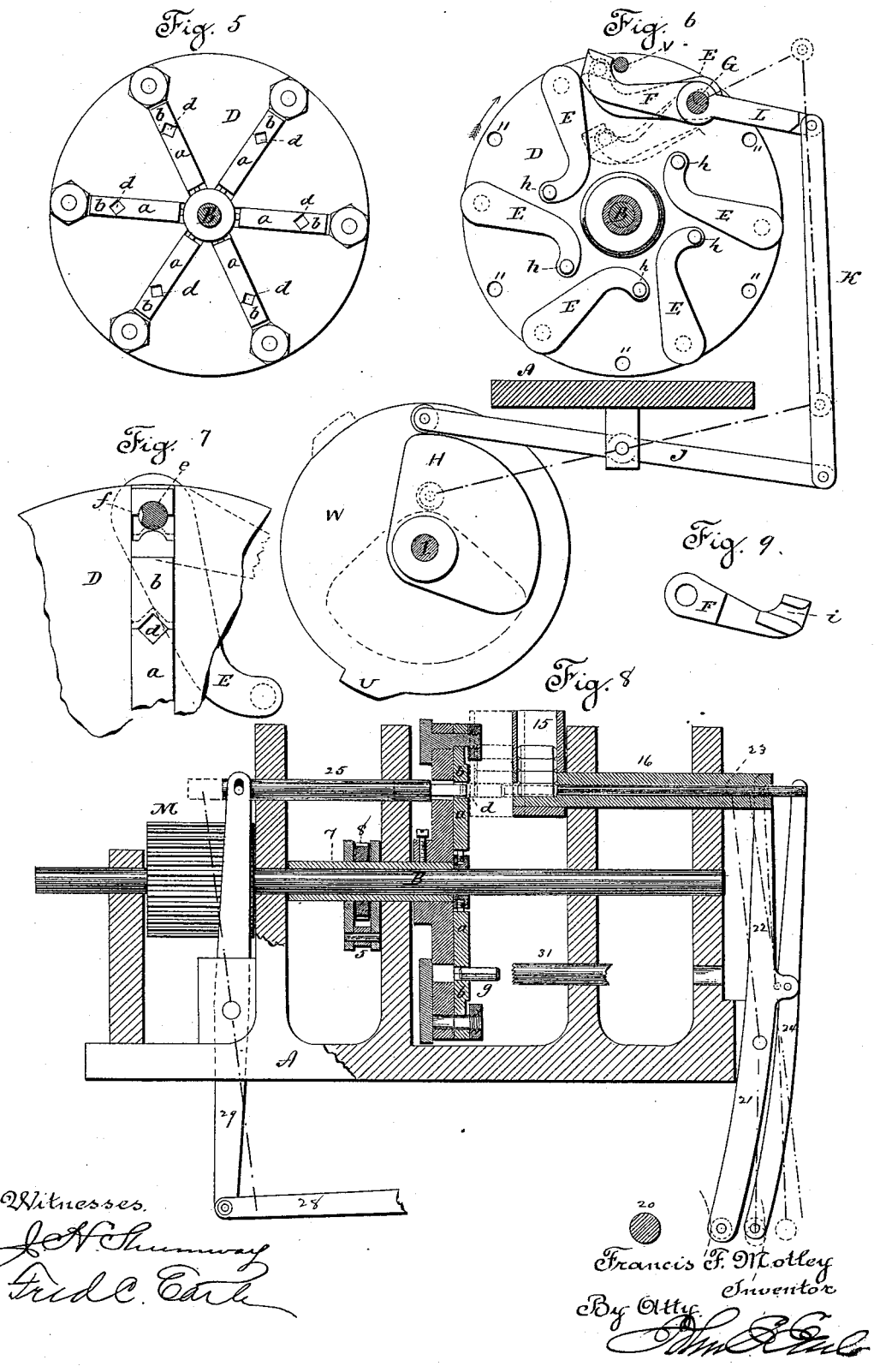

(Model.)

F. F. MOTLEY.
SCREW MACHINE.

No. 337,976. Patented Mar. 16, 1886.

Witnesses.
J. H. Shumway
Fred C. Earle

Francis F. Motley
Inventor
By Atty.

UNITED STATES PATENT OFFICE.

FRANCIS F. MOTLEY, OF NEW HAVEN, CONNECTICUT, ASSIGNOR TO REYNOLDS & CO., OF SAME PLACE.

SCREW-MACHINE.

SPECIFICATION forming part of Letters Patent No. 337,976, dated March 16, 1886.

Application filed December 28, 1885. Serial No. 186,858. (Model.)

*To all whom it may concern:*

Be it known that I, FRANCIS F. MOTLEY, of New Haven, in the county of New Haven and State of Connecticut, have invented a new Improvement in Machines for Making Screws; and I do hereby declare the following, when taken in connection with accompanying drawings and the letters of reference marked thereon, to be a full, clear, and exact description of the same, and which said drawings constitute part of this specification, and represent, in—

Figure 15:
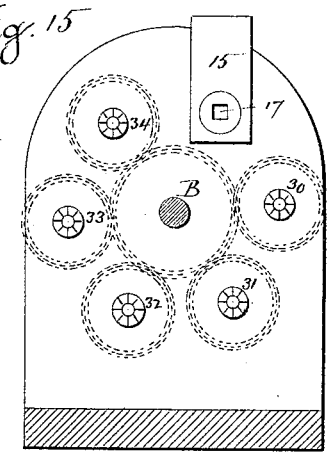
Figure 10:
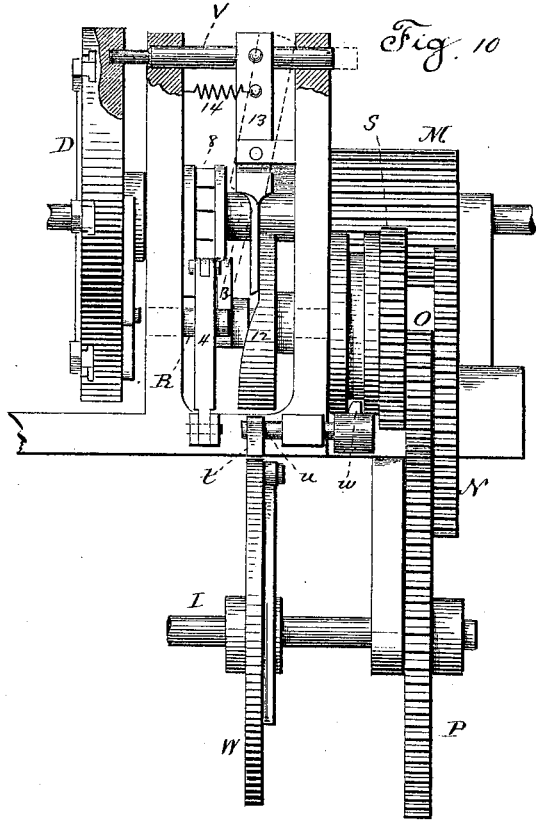
Figure 14:
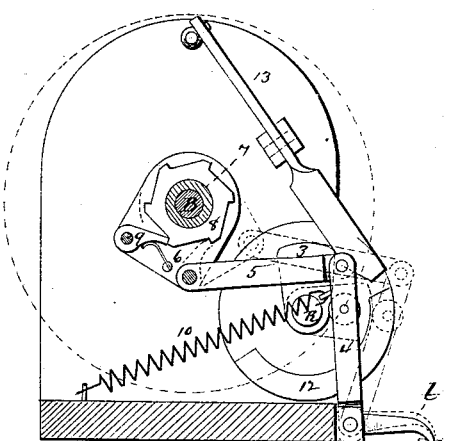
Figure 11:
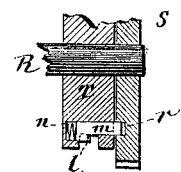
Figure 13:
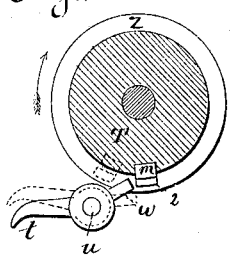
Figure 12:
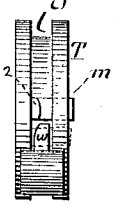
Figure 16:
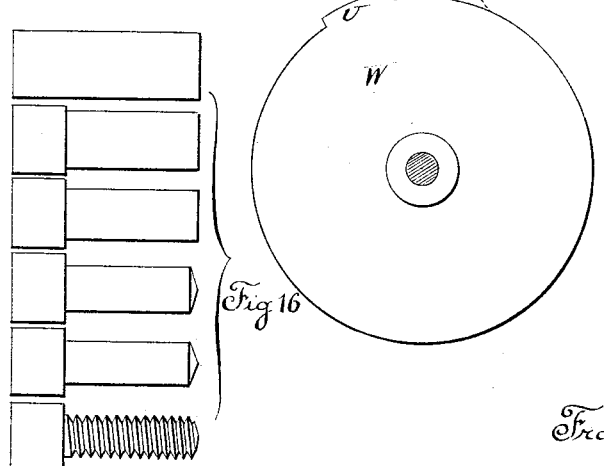

Figure 1, a front view of the machine complete; Fig. 2, a top or plan view of the same; Fig. 3, an end view from the right of Fig. 1; Fig. 4, an end view from the left of Fig. 1, the driving-pulleys omitted; Fig. 5, a face view of the intermittently-rotating disk; Fig. 6, a transverse section of the machine, showing a rear view of the disk and the operative mechanism for opening and closing the holding-dies; Fig. 7, a face view of a portion of the holding-disk, showing the cam for operating the holding-dies; Fig. 8, a longitudinal central section through the disk-hopper, and showing the two followers; Fig. 9, an inside view of the lever F; Fig. 10, a view from the rear, showing the clutching-disk and turning and locking devices; Figs. 11, 12, and 13, detached views of the clutching mechanism; Fig. 14, a transverse section, cutting in rear of the bearing back of the holding-disk, showing the mechanism for imparting rotation to the disk; Fig. 15, a transverse section cutting in front of the holding-disk, and looking toward the mandrels and hopper; Fig. 16, the blank in the several steps to the complete screw; Fig. 17, a modification of the feeding device.

This invention relates to an improvement in machines for making that class of machine-screws which are usually made direct from the rod, the rod being of the size required for the head, and the body reduced by means of cutting-dies or blanks cut from the rod, the body formed in the same manner, and in contradistinction to the class of screws in which the rod is the size required for the body of the screw and the head upset, the object of my invention being to construct a machine which is adapted to receive a succession of blanks cut from the rod and successively transfer them from the feeding device to different positions for the successive operations required in the formation and completion of the screw; and the invention consists in the combination, in a machine for making screws, of a disk having an intermittent step-by-step rotation imparted to it, the said disk provided with a series of blank-holding devices equidistant from each other and arranged in a line concentric with the axis of said disk, the holding devices adapted to receive and hold the blanks projecting from the face of the disk parallel with the axis, with a feeding device arranged to automatically and successively deliver blanks into the holding devices on the disk, and a series of revolving tools corresponding to the holding devices in the disk and in line therewith when the said holding devices are in their place of rest, the said tools arranged to be moved backward and forward from the disk, and whereby said tools will successively operate upon the said blanks to finally complete the screw, and also in details of construction more fully hereinafter described, and particularly recited in the claims.

A represents the bed of the machine, upon which the operative mechanism is arranged; B, the driving-shaft arranged in suitable bearings longitudinally above the bed, and to which power is applied through a pulley, C, or otherwise.

D is the blank-holding disk, arranged upon or concentric with the shaft B, but without engagement with said shaft, and so that the disk may be rotated independent of the shaft.

The holding-dies are arranged in the disk radially, as seen in Fig. 5, and equidistant from each other. These holding-dies are in two parts, *a b*, the inner part, *a*, fixed in the disk and the part *b* guided therein, so as to be moved radially toward or from the part *a*. In the adjacent faces of the two parts a recess, *d*, is formed, corresponding to the shape of the blank to be held, or adapted to hold a blank which may be introduced between them. As here represented this recess is square. The several pairs of dies are arranged equidistant from each other and the recesses in a line concentric with the axis upon which the disk rotates. The holding-dies are shown enlarged in Fig. 7. At the outer end of the part *b* of the die *a* a cam, *e*, is arranged upon an axis parallel with the axis of the disk, and so that the periphery of the cam may bear upon the end of the part *b*, as seen in Fig. 7. The cam is cylindrical, except at one point, *f*, where it is recessed. The periphery of the cam is adapted to force the dies together and hard upon the blank; but the recess *f* when brought into line with the part *b* will permit the part *b* to recede from the part *a*, as indicated in broken lines, Fig. 7, and whereby the recess *d* between the dies is opened. A blank introduced between the dies in their open condition, as indicated in broken lines, Fig. 7, and the cam then rotated, as seen in Fig. 7, will force the part *b* upon the blank, and so grasp it as to hold it projecting from the blank in a line parallel with the axis of the disk, as seen at *g*, Fig. 8. Upon the reverse side of the disk D, as seen in Fig. 6, a lever, E, is fixed to each cam, and so that the cam may be rotated by turning the said levers. The levers swing in a plane parallel with the disk. From the free end of each lever there is a projecting stud, *h*, and which in the closed position stands in a path concentric with the axis of the disk, as seen in Fig. 6.

In Fig. 6 the lever which is uppermost is represented as turned outward, its inward or normal position being indicated by the broken lines in that figure. The other five levers stand in their inward or normal position.

In Fig. 7 a partial face view of the disk is shown, with one of the levers indicated in the down position, as with the holding-dies closed, broken lines in that figure indicating the up or open position of the lever and the holding-dies.

The outward or up position indicated in Fig. 6, and in broken lines, Fig. 7, releases the part *b* of the holding-dies, as seen in Fig. 7, so that it may recede and open the holding-dies. The opening of the holding-dies occurs at one point in the rotation of the disk D, as indicated in Fig. 6.

The turning of the levers to open and close the dies is produced by a lever, F, hung upon a rock-shaft, G, the oscillating movement being imparted to the said rock-shaft from a cam, H, on the counter-shaft I below the bed, through an intermediate lever, J, connecting rod K and arm L, as seen in Fig. 6. The said lever F stands immediately back of the levers E, in the same plane therewith, as seen in Fig. 2, but in the path of the stud *h* on the respective levers.

The face of the lever F next the levers E is constructed with a groove, *i*, into which the studs may respectively pass as the disk is rotated in the direction indicated by the arrow, Fig. 6, and when the lever F is in the down position, indicated in broken lines, Fig. 6. As the stud of a lever E enters the groove *i* in lever F, the disk D comes to a rest at such time. Then the lever F being raised, as indicated in Fig. 6, will turn the lever E upward, so as to bring the recess *f* in the cam into a position to release the part *b* of the die. Then the blank is introduced and the lever F returns to the position indicated in broken lines, Fig. 6. In the next step in the rotation of the disk the stud of that lever will pass out from the groove *i* and escape from engagement with the lever F. Then the second lever E, presented in like manner, will be turned upon the dies to receive a blank and close the dies, and pass on, as before, so that at each step in the rotation of the disk D one die will be opened to receive a new blank, then closed, and after a full rotation of the disk, when all the blanks have been filled, as the first die is again presented with its blank the opening of the die will permit the blank to be removed and another introduced.

The step-by-step rotation of the disk D is imparted from the counter-shaft I. This shaft is arranged to make one full revolution during the rest required for the disk D, but revolves constantly, and it receives its revolution from a pinion, M, on the driving-shaft working into a gear, N, which carries upon its axis a pinion, O, which in its turn works into a gear, P, on the shaft I. If a greater or less time of rest is required for the disk D, then the intermediate gearing between the pinion M on the driving-shaft and the gear P on the counter-shaft is changed or adjusted accordingly.

R is a counter-shaft parallel with the driving-shaft, on the end of which there is loosely fixed a gear, S, which works into the pinion M, and receives rotation therefrom. Adjacent to this gear S is a clutch, T, made fast to the shaft R, as seen in Fig. 11, and in which is an annular groove, *l*.

In the clutch T is a bolt, *m*, arranged to slide in a plane parallel with the axis of the disk, and, under the action of a spring, *n*, may be forced into a corresponding hole, *r*, in the gear S, and so that when so engaged the rotation of the gear S will be imparted to the clutch T and to the shaft R; but if the bolt be withdrawn, as indicated in broken lines, Fig. 11, then the clutch will be disconnected from the gear and remain stationary, while the gear will continue its revolution. This engagement between the shaft R and gear S is made once during each revolution of the shaft I, and this engagement is produced by a short radial projection, U, on a cam, W, on the shaft I, as seen in Fig. 14. In the path of this projection is the nose of a lever, *t*, which may ride on the periphery of the cam W. The lever is fixed to a shaft, *u*, (see Fig. 10,) and as the projection U passes beneath the nose of the lever *t* it will raise that lever and impart a corresponding oscillation to the shaft *u*. On this shaft *u* is a dog, *w*, which stands in the groove *l* of the clutch T, as seen in Figs. 12 and 13. It is inclined upon its face toward the bolt-spring *n*, and the bolt *m* is constructed with a corresponding shoulder, 2. (See Fig. 12.) When the lever *t* is raised, as seen in broken lines, Fig. 13, the nose of the dog is turned out of the path of the bolt when the clutch revolves; but when the lever $t$ is turned downward, as seen in Fig. 13, then the dog $w$ stands in the path of the shoulder 2 on the dog, and so that as the clutch revolves the bolt will pass onto the dog and be thereby withdrawn, as indicated in broken lines, Fig. 11, and will be so withdrawn as long as the lever $t$ remains in a down position; but so soon as the lever $t$ is raised then the dog $w$ escapes from the bolt and permits the bolt to be thrown toward the gear S and engage a corresponding hole or recess, $r$, in the gear. Then the gear and clutch will revolve together. The time in which the lever $t$ is raised to hold the dog out of the path of the bolt is considerably less than that of one full revolution of the clutch; hence soon after the engagement of the clutch with the gear is made, as before described, the lever $t$ passes from the projection $u$ and turns the dog into the path of the bolt, as seen in Figs. 10 and 11, and so that as the clutch completes its revolution the bolt will pass onto the dog and be withdrawn, as indicated in broken lines, Figs. 11, 12, and 13. The revolution of the clutch T is imparted to the shaft R. On the shaft R is a cam, 3, (see Fig. 14,) which works against a lever, 4, and from which a connecting-rod, 5, extends to a lever, 6, hung loose upon the hub 7 of the disk D of the driving-shaft B. Upon the hub 7 of the disk, and adjacent to the lever 6, is a ratchet-wheel, 8, having teeth corresponding in number to the holding-dies in the disk D, and on the lever 6 a spring-pawl, 9, is arranged, adapted to engage the teeth of the said wheel 8. As the shaft R revolves, as before described, it imparts a swinging movement to the lever 6, as indicated in broken lines, Fig. 14. The pawl 9, being engaged with one tooth of the ratchet-wheel 8, imparts rotation to the disk one step, as indicated in broken lines, Fig. 14. Then as the lever 4 falls from the cam 3 the lever 6 and its pawl return under the action of a suitable spring, 10. From this it will be seen that at each single revolution of the shaft R one rotative step will be imparted to the disk D, the disk remaining stationary during the intervals of rest of the shaft R.

To lock the disk D at its place of rest and at the end of each step in its rotation, I arrange a bolt, V, parallel with the axis of the disk and supported in suitable bearings, and in the disk I provide corresponding recesses, 11, (see Fig. 6,) and so that when the disk arrives at its place of rest the bolt will be thrown into one of the recesses, and then when the time arrives for the next step in the rotation of the disk to be taken the bolt is withdrawn, as indicated in broken lines, Fig. 10. The bolt is thus operated by means of a cam, 12, on the shaft R, through a lever, 13, hung to the bolt, the cam 12 acting to draw the bolt just before the rotative movement of the disk commences, and to permit the bolt to be thrown into engagement with the disk by the action of a spring, 14, when it shall have arrived at its place of rest.

Opposite the face of the disk D is a hopper, 15. This hopper is attached to a slide, 16, arranged in suitable bearings, and so that the hopper may be moved toward or from the face of the disk.

The hopper is constructed to receive a column of blanks, as seen in Fig. 8, the blanks lying therein parallel with the axis of the disk. The blanks lie one upon another, and at the bottom, on the side next the disk D, is an opening, through which one of the blanks may be passed, and this opening stands in line with the opening between the pair of holding-dies on the disk, which stand open, as before described, to receive a blank, as seen in Fig. 8. The slide 16, with the hopper 15, at the proper time is moved toward the disk by the action of a cam, 18, on a counter-shaft, 19, at right angles to the shaft I, from which the shaft 19 receives revolution through bevel-pinions 20, (see Fig. 3,) the said cam 18 working upon one arm, 21, on a lever, the other arm, 22, of the same lever engaging the slide 16, as seen in Figs. 3 and 8, and so that at the proper time the slide, with the hopper, is moved forward toward the disk, as seen in Fig. 8.

Through the slide 16 is a follower, 23, actuated by a cam-section on the same disk in which the cam 18 is formed, that moves the hopper through a lever, 24, in connection with the follower, as seen in Figs. 3 and 8, and so that as the hopper arrives at a position near the disk the follower advances and forces the lowest blank from the hopper and between the corresponding dies on the disk, as indicated in broken lines, Fig. 8. Then the blank is grasped, as before described, the hopper and follower retreat, and the disk rotates to present the next pair of holding-dies to receive a blank in like manner, and so continuing, the disk rotating step by step, and at each step receiving a new blank, and until, finally, the blank first introduced will return to the position from which it started. Then a follower, 25, arranged upon the reverse side of the disk and in line with the follower 23, is advanced, as seen in Fig. 8, so as to force the blank from the holding-dies and make way for another blank, and as the blank is thus discharged the follower 25 retreats, as indicated in broken lines, Fig. 8. This reciprocating movement of the follower 25 is imparted from a cam, 26, through a lever, 27, connecting-rod 28, and lever 29, the last hung to the follower 25, as seen in Fig. 1. Thus when the machine is in the full working order a blank will be discharged and a new one introduced at each rest of the disk D.

Opposite the face of the disk D a series of revolving tools are arranged. These tools are represented as 30, 31, 32, 33, and 34, Fig. 15. These tools are in the end of corresponding mandrels. (See Figs. 1 and 2.) Rotation is imparted to the mandrels by a pinion, 35, on the driving-shaft, working into corresponding pinions, 36, on the respective mandrels. The several mandrels are parallel with the axis of the driving-shaft and in a line concentric with the driving-shaft, the several mandrels being directly in line with the holding-dies on the disk D, and so that when the disk D stands at rest and in working condition there will be one blank in line with each of the said tools. A forward-and-back movement is imparted to the several mandrels by means of cams on the counter-shaft 19 through levers between said cams and said mandrels, as seen in Figs. 1, 2, and 3, the cams being timed so as to advance and withdraw the said mandrels, with the tools they carry, during the time of rest of the disk D. Each of the tools in the mandrel is fitted for its proper work upon the blank, they in turn gradually reducing the blank, and finally threading and finishing, the blank from the start to finish being shown in the several steps in Fig. 16. The hopper being constantly supplied with blanks cut to the required length, the blanks will be successively transferred therefrom to the holding-disk D, and by the disk presented to the respective operating-tools until, finally, the finished screw arrives at the point where the blank was introduced, and there the finished screw will be discharged and a new blank introduced. The machine is thus automatic in its action, only requiring that the hopper shall be supplied with blanks to maintain a continuous action.

As the time of rest must be governed by the amount of work to be done upon the blank, it follows that in the manufacture of different sizes of screws a longer or shorter time of rest will be required, accordingly as the screw is longer or shorter. Such time of rest, as before described, is determined by the single revolution of the shaft I, from which the operative parts of the machine derive their working movement, the mandrels receiving their rotation only from the driving-shaft, which is constant. If, therefore, the shaft I revolve slower, then the time of rest will be longer, and vice versa. To make such adjustment, the intermediate gearing between the pinion M on the driving-shaft and the gear P on the counter-shaft is changed accordingly— that is to say, if the screw be longer, and the time of operation consequently longer, then the counter-shaft on which is the gear P must revolve slower, or if the screw be shorter, then the counter-shaft may revolve faster.

While I prefer to arrange the hopper as I have described to deliver the blanks, they may be otherwise fed so as to be automatically delivered to the holding devices—as, for illustration, as seen in Fig. 17, the hopper may be arranged at one side of the disk and a rock-shaft, 37, arranged in suitable bearings parallel with the axis of the disk and carrying an arm, 38, which is provided at its end with fingers 39, adapted to pass through the bottom of the hopper and take therefrom the lower blank. Then, under the oscillation of the rock-shaft, at the proper time the arm will turn toward the disk, as indicated in broken lines, so as to present the blank so taken from the hopper into the proper position for introduction into the holding devices. I therefore do not wish to be understood as limiting my invention to a single specific device for feeding, as any suitable feeding device may be employed which will automatically and successively deliver a blank to the holding device on the disk while the disk is at rest.

I claim—

1. In a machine for making screws, the combination of an intermittently-rotating disk provided with a series of blank-holding devices equidistant from each other, the said holding devices arranged in a circle in said disk concentric with the axis of the disk, the said holding devices adapted to receive and hold blanks projecting from the face of the disk parallel with the axis of the disk, mechanism, substantially such as described, to impart intermittent rotation to said disk and holding devices, a feeding device, substantially such as described, adapted to automatically and successively deliver a blank into each of said holding devices as they are successively presented to said feeding device, a series of revolving mandrels carrying tools arranged in a circle concentric with the axis of the disk, and the axis of the said mandrels parallel with the axis of the said disk, and the said series of tools in axial line with the respective tool-holders in the said holding-disk when the said disk is in its position of rest, a driving-shaft axially extending within the circle on which the said revolving tools are arranged, a gear upon said shaft, and a corresponding pinion on each of the said mandrels, substantially as described, and whereby, under the rotation of the said driving-shaft, rotation is imparted to the respective mandrels.

2. In a machine for making metal screws, the combination of a series of mandrels carrying tools adapted to successively perform their work upon screw-blanks, the said mandrels arranged equidistant from each other and in a circular line around a concentric driving-shaft, the mandrels themselves being parallel with the said driving-shaft, the said mandrels arranged to receive a longitudinal or advance and retreating movement, a disk arranged upon an axis concentric with the center around which the said mandrels are arranged, the said disk having an intermittent or step-by-step rotation imparted to it, and carrying in its face toward the said tools holding devices corresponding to the said revolving tools, and adapted to hold a series of blanks respectively in line with the tools, a hopper arranged upon a slide parallel with the axis of rotation of said disk, and so as to be moved toward or from the face of said disk, and constructed with an opening therefrom in line with one of said holding devices in the disk when the disk is at rest, and a follower arranged to work through said hopper and toward the disk, substantially as described, and whereby the lower blank in the column of blanks in the hopper will be transferred from the hopper into the grasp of the holding device in the disk, substantially as described.

3. In a machine for making metal screws, the combination of a series of mandrels carrying tools adapted to successively perform their work upon screw-blanks, the said mandrels arranged equidistant from each other and in a circular line around a concentric driving-shaft, the mandrels themselves being parallel with the said driving-shaft, the said mandrels arranged to receive a longitudinal or advance and retreating movement, a disk arranged upon an axis concentric with the center around which the said mandrels are arranged, the said disk having an intermittent or step-by-step rotation imparted to it, and carrying in its face toward the said tools holding devices corresponding to the said revolving tools and adapted to hold a series of blanks respectively in line with the tools, a hopper arranged upon a slide parallel with the axis of rotation of said disk, and so as to be moved toward or from the face of said disk, and constructed with an opening therefrom in line with one of said holding devices in the disk when the disk is at rest, a follower arranged to work through said hopper and toward the disk, and a second follower arranged in line with the first, but on the opposite side of the disk, and having an intermittent forward and back movement imparted to it, all substantially as described.

4. In a machine for making metal screws, the combination of a series of mandrels carrying tools adapted to successively perform their work upon the screw-blanks, the said mandrels arranged equidistant from each other and in a circular line around a concentric driving-shaft, the mandrels being parallel with the said driving-shaft, the said mandrels arranged to receive a longitudinal or advance and retreating movement, a disk arranged upon an axis concentric with the center around which the said mandrels are arranged, the said disk having an intermittent or step-by-step rotation imparted to it, holding-dies $a\,b$, arranged radially in the said disk, the dies constructed with a recess in their meeting faces corresponding to the blank to be held, and the said recesses being in line with the respective mandrels when the disk is in a state of rest, cams $e$, arranged in said disk, and adapted to force one of the parts of the holding-dies toward the other, a lever, E, fixed to each of said cams and carrying a stud, $h$, in their free end, with a lever, F, arranged to swing in a plane parallel with the said levers E and constructed with a groove, $i$, into which the said studs $h$ may pass, and the mechanism, substantially such as described, to impart swinging movement to said lever F, whereby the one of said levers E presented to said lever F as the disk comes to a state of rest will be correspondingly turned to open and close the holding-dies, substantially as specified.

5. In a screw-making machine, the combination of a driving-shaft, a series of mandrels parallel to said shaft and arranged concentrically about said driving-shaft, the said mandrels receiving a constant revolution from said driving-shaft, said mandrels carrying in their ends tools arranged and adapted to perform successive operations upon the blank, an intermittently-rotating blank-holding disk arranged upon said driving-shaft, but loose thereon, the said disk having in its face adjacent to the tools in the said mandrels holding devices adapted to receive and hold a blank, and under the intermittent rotation of the said disk to successively present the blanks so held to the revolving tools, a counter-shaft, I, in changeable gear-connection with the said driving-shaft, cams in connection with the said shaft I, arranged to impart longitudinal back and forward movement to said mandrels, a counter-shaft, R, a gear, S, loose on said shaft R and in gear-connection with the driving-shaft, whereby constant rotation is imparted to said gear S, a clutch, T, fixed to said shaft R, the spring-bolt $m$ in said clutch, adapted to engage the said gear S, the cam W on said shaft I, and the trip mechanism, substantially such as described, between said cam W and the said clutch, whereby the said bolt is permitted to engage with or forced to disengage from said gear S at predetermined times, with a pawl and ratchet between said shaft R and said disk, substantially as described, and whereby the said intermediate rotation is imparted to said disk.

FRANCIS F. MOTLEY.

Witnesses:
LOUIS C. SMITH,
W. H. REYNOLDS.